Dec. 16, 1924.

J. THOMSON 1,519,564

PROCESS OF REMOLDING HARD RUBBER WATER METER DISKS TO PRECISE DIMENSIONS

Filed April 16, 1923    2 Sheets-Sheet 1

INVENTOR:
John Thomson

Dec. 16, 1924.                                                1,519,564
J. THOMSON
PROCESS OF REMOLDING HARD RUBBER WATER METER DISKS TO PRECISE DIMENSIONS
Filed April 16, 1923           2 Sheets-Sheet 2

INVENTOR:
John Thomson.

Patented Dec. 16, 1924.

1,519,564

UNITED STATES PATENT OFFICE.

JOHN THOMSON, OF BROOKLYN, NEW YORK.

PROCESS OF REMOLDING HARD-RUBBER WATER-METER DISKS TO PRECISE DIMENSIONS.

Application filed April 16, 1923. Serial No. 632,479.

*To all whom it may concern:*

Be it known that I, JOHN THOMSON, a citizen of the United States, and a resident of the borough of Brooklyn, city and State of New York, have invented a Process of Remolding Hard-Rubber Water-Meter Disks to Precise Dimensions, of which the following is a specification.

This invention relates to water meters, consisting in a process of remolding hard rubber disks to precise dimensions; and the objects thereof are to produce such articles with greater accuracy and smoothness of surface, and at a diminished cost, relative to the prevailing modes of manufacture.

In the disk type of water meter, which now dominates the market, the most difficult member to produce, that is within a close plus and minus tolerance of the exact dimensions sought, is the ball-and-disk used as a nutating piston but popularly referred to under the unitary term "disk." That the many attempts to vulcanize rubber in steel molds and thereby turn out a fully or nearly finished disk have not been satisfactory is well attested by the fact that the hundreds of thousands of them now being made annually are machined from rough-stock, usually by diamond-pointed tools, or by grinding, or both. The present applicant formerly endeavored to mold disks direct from-the-crude, and also to remold them from pre-vulcanized disks, but such success as was attained did not meet technical and commercial requirements and a continuation of that line was abandoned.

With respect to hard rubber per se, the state of the art is so well known that a present recitation thereof would seem to be supererogatory; but it may serve to more readily visualize the ensuing subject-matter to briefly state that, when so confined as to prevent displacement, rubber is about as irresponsive to compressive deformation as water. When heated, say from about 225° to 300° F., depending upon its compounding, hard rubber becomes plastic, when it may be likened to molten sealing-wax, or bitumen, or the pasty condition of wrought iron at its welding temperature. In fact, it then simulates a fluid; which, however, is characterized by possessing an abnormally high viscosity. Again, if brought into contact with cold metal, its heat is rapidly conveyed away and it "sets" rapidly.

The essence of this process may be expressed as follows: To so pre-form a hard-rubber article, such as a water meter disk, that its ultimate operative surfaces shall be of lesser dimensions than that of the said article when remolded; to place said under-sized article in a separable die whose molding cavity is of the precise dimensions required in the finished product; to thenafter firmly clamp the die sections together; to heat the said die and the blank contained therein to some pre-determined temperature at which hard-rubber becomes adequately plastic; to drive a plunger, or plungers, into the mastic, causing it to displace, as in the instance of a fluid, until the free space of the die-cavity is completely filled; and to then cool the die and the article therein prior to relieving the imparted pressure.

As herein employed, the unitary term "disk," or "disk-piston," is to be taken in an inclusive rather than restrictive sense; for it is, in fact, the designation of common parlance applied to a circular plate having at its transverse axis a sphere or ball. Again, when mounted in a suitable chamber and functioning as a water meter, it is popularly known as "the disk action."

The various steps in this process and means of realizing it are best describable with the aid of pictorial illustrations, wherefore the accompanying drawings, which form a part of this specification and denote a preferred embodiment of the invention, are submitted; thus—

Figure 2:
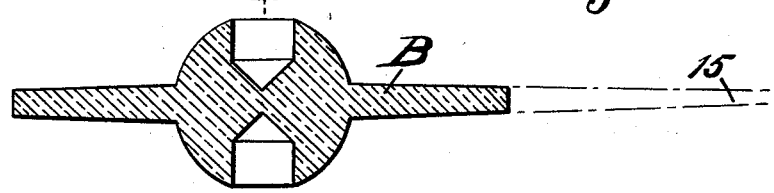
Figure 2 is a view similar to that of Figure 1 but showing a disk after it has been swollen to the accurate dimensions of a die-cavity whose volume is greater than that of the pre-formed disk.
Figure 4:
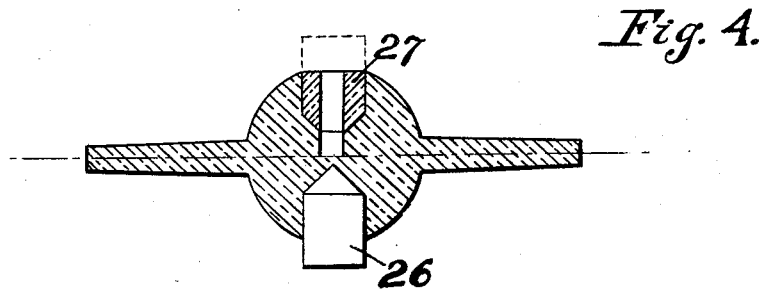
Figure 5:
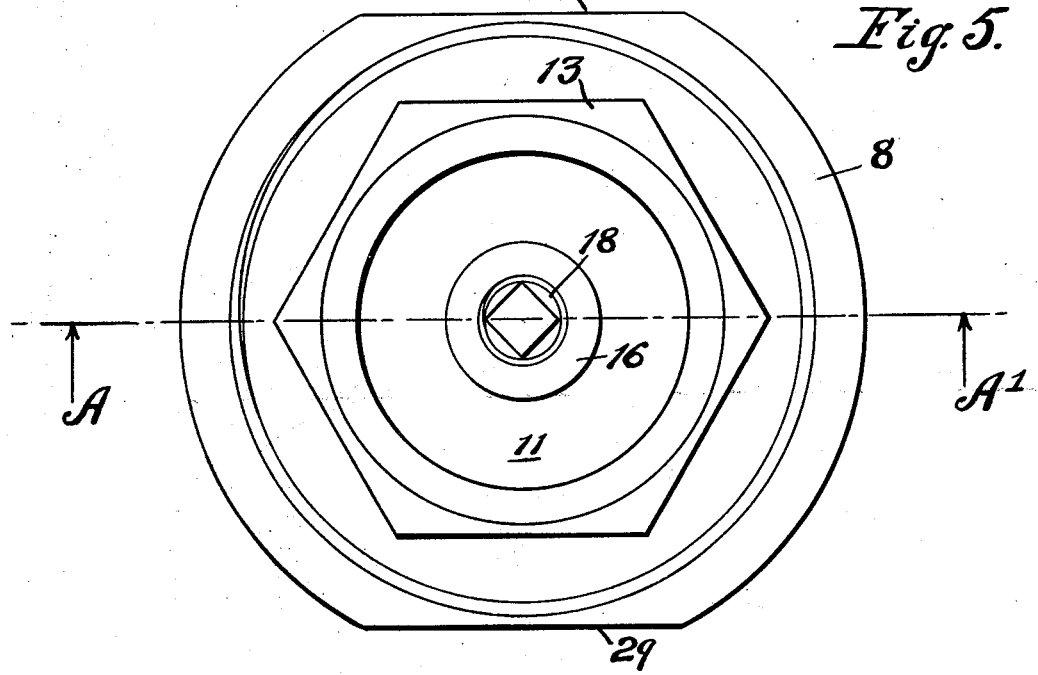

Figure 4 denotes a modification over that of Figure 2;

Figure 5 is a plan view of an appropriate molding-die; and

Figure 6:
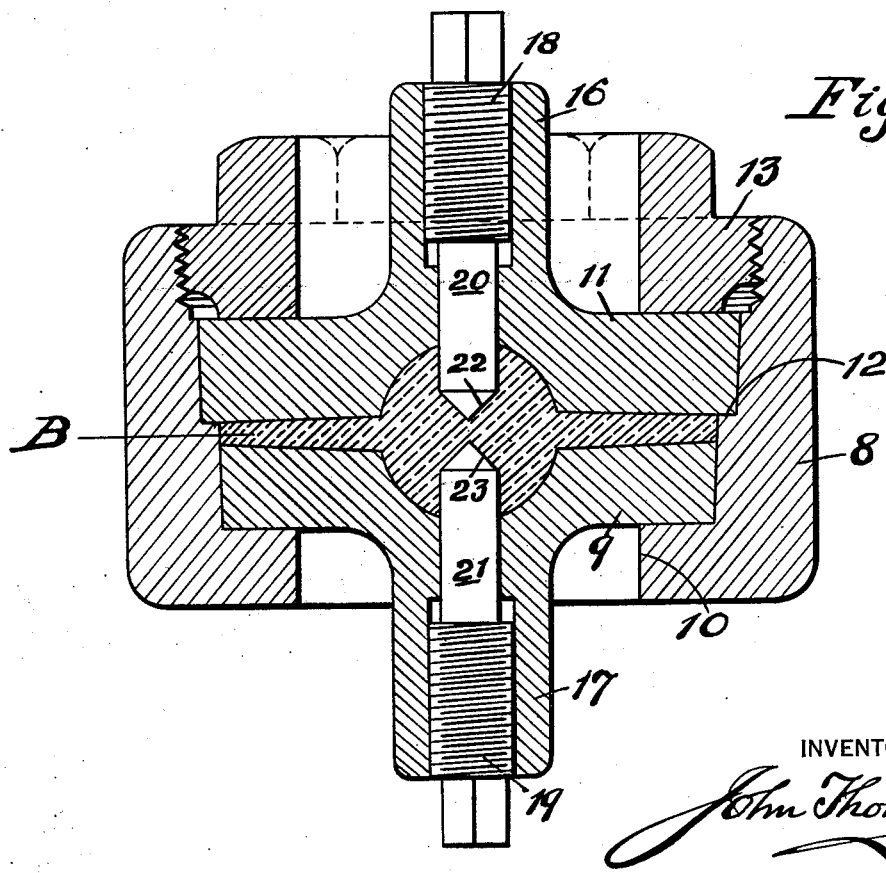

Figure 6 is a transverse center section of said die, as along the line A—A$^1$ of Figure 5.

This molding-die, for accomplishing the finishing operation, is comprised in a cylinder 8, wherein is a free plug 9, resting upon a flange 10; another superimposed co-ordinating free-plug 11, resting upon a shoulder 12, within the cylinder; and a cylindrical threaded nut 13 acting against the outer face of plug 11. The inner surfaces of the plugs are accurately machined and so spaced one from the other of them as to form the cavity required to produce the finished disk, B, that is finished with respect of the spherical contour of the ball and the co-ordinating disk-faces.

When the plugs and the under size disk are in place within the cylinder, the nut is turned down snugly, whereby said plugs are rigidly confined to their respective gauge positions. If desired, the nut-thread may be mutilated; whereby to be more quickly engaged and disengaged.

The disk-faces are here-shown as converging from the ball towards each other, as 14, 15, but they may be divergent or parallel, as one may prefer.

Each plug has a neck, as 16, 17, in which are mounted headed screws, 18, 19, whose inner extensions 20, 21, serve as plungers, their end-faces being preferably beveled, 22, 23; the angle here shown being 45°. It will be apparent that when the plugs, disk and nut are assembled, the aforesaid screws must be withdrawn so that their points will not impinge upon the disk-ball.

Figure 3:
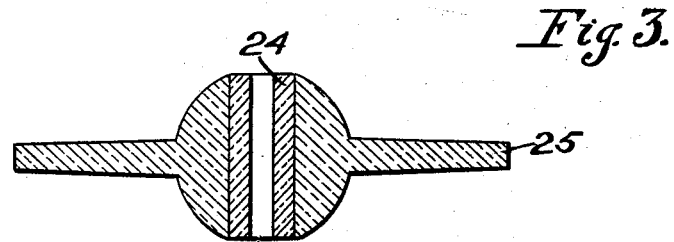
Figure 3 depicts the disk of Figure 2 after being prepared to receive a pin or spindle.

And now come the more crucial steps in this process: Firstly, heat the die to the temperature at which the usual grades of hard-rubber become adequately plastic for this purpose, that is from about 225° to 250° F.; secondly, simultaneously turn the screws inwardly until the pressure exerted by their plungers becomes whatever pre-determined tests have shown to be sufficient; thirdly, cool the die to about atmospheric temperature; fourthly, remove the clamping nut, push out the plugs and disengage the disk, whose present form will be that shown in Figure 2. In these circumstances, the dimensions of the disk, and the smoothness of its surfaces, will be practically identical with that imparted to the plugs. The remaining operations consist in drilling through the ball, as Figure 3, inserting a sleeve 24, finishing the periphery 25 and forming the diaphragm slot, not shown.

Figure 1:
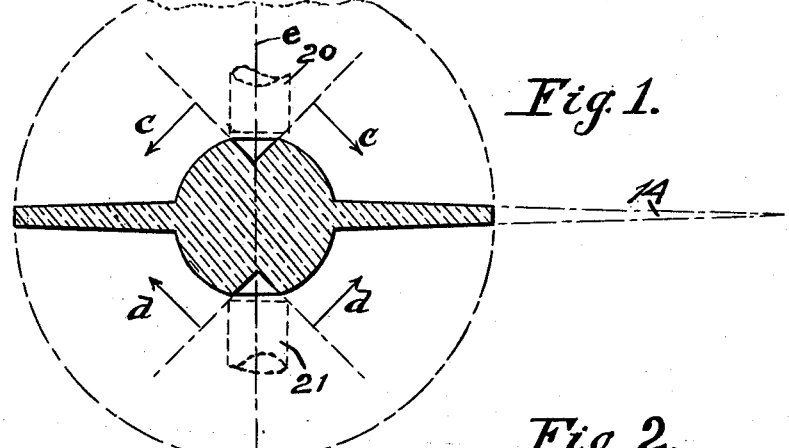
Figure 1 is a transverse section of an undersized water meter disk-piston whose circular contour is indicated in dotted outline, and this figure is also utilized as an illustrative diagram.

A unique advantage hereof results from the employment and simultaneous actuation of two displacing plungers, particularly when their faces are beveled; thus, as diagrammatically indicated in Figure 1, the pressure is generated at and the flow proceeds from two sources located in the vertical axis $e$, each thrust, as arrows $c$, $d$, balancing the other; the resultant thereof being radially directed towards the outlying disk-portion, driving the mastic-like rubber along the faces of the plugs. A notable contingent advantage thereof is that any air within the cavity is rolled out to the periphery of the disk, where free vents to atmosphere can be provided.

Instead of producing displacement of the rubber by plungers revolving therein, separate tits may be inserted, as of fibre, graphite, or metal; which would be driven in, like pins, and remain in place. An example of such a procedure is exhibited in Figure 4, the lower tit 26 appearing as it would come from the die, whilst the upper tit 27 is shown as when faced off and drilled in place.

The plugs and disk are removed from the cylinder as an integral unit, in that they are snugly held together by atmospheric pressure; but again the plungers come into play, for, by slightly turning the screws, the air-seal is broken and the disk freed.

The sides of the cylinder may be flattened, as 28, 29, Figure 5, for convenience in holding it when inserting or removing the clamping nut.

The density, rigidity and strength of the remolded disk are substantially greater than when, for example, it was vulcanized in a rough molded state. Thus, the temperature may be less and the pressure exertable, due to the nominal cross-sectional area of the plungers, is limited only by the resistance of the die to deformation.

The term "rough-molded," as here employed, may be taken to mean an article some thousandths or hundredths of an inch under-size, whereby to primarily take its place freely in the die-cavity and imposing but a relatively nominal volumetric displacement by the plungers, whereby to cause the plastic rubber to swell and fill the interstitial spaces of the die-cavity.

Whilst the use of compound simultaneous actuated plungers are regarded as a distinctly preferable system of realizing this step in the process, yet satisfactory results are obtainable by the employment of a single plunger. This is particularly the case if the pre-formed disk is but slightly undersize, requiring but a nominal amount of displacement.

Although not indicated in the drawings, the plungers are preferably ground slightly tapering, whereby to be more readily withdrawn from the finished article.

It is not necessary to pre-mold or drill the centers for pointed plungers, as shown in Figure 1, although this procedure lends itself to the utmost realization of the process. Nor is it essential that the undersized disk shall be pre-molded in that, if needs be, it may be machined from blocks or plates.

The plunger-screws may be actuated manually or mechanically as one may prefer; and extraneous means can readily be provided for limiting the impartable pressure. So, too, the plungers may be actuated by levers, or hydraulically. Thus and by also preheating one disk after another to the same temperature, the uniformity attainable, in points of density and accuracy, is as close an approximation to precision as is commercially feasible; moreover, relative to production by machining, a substantial diminution ensues as to their cost.

Whilst this process and the means for its realization have been more particularly described in relation to disks, which is probably the most difficult exhibit that could be selected, they are readily applicable to the production of other portions of water meters in which a high degree of accuracy is desirable; and also to various articles which are moldable from heat-softened hard-rubber or other materials of analogous characteristics.

What I claim is:

1. The process of remolding a hard rubber disk to precise dimensions which consists in pre-forming it to lesser than the required finished dimensions; inserting it in a separable molding die and clamping said die together; heating them to a temperature at which hard rubber becomes plastic and flowable; pressing a plunger, or plungers, into the mastic, thereby causing the displaced mastic to completely fill the die-cavity, and then cooling the disk in place.

2. The process of forming a disk to precise dimensions consisting in preforming the disk to less than the required finished dimensions, heating it to a temperature at which its material becomes plastic and flowable, subjecting the plastic disk to pressure directed axially thereof and localized on a relatively small area while the disk is confined in a die having the precise dimensions required, and finally cooling the disk in place.

3. The process of forming a hard rubber disk to precise dimensions consisting in preforming it to less than the required finished dimensions, heating it to a temperature at which hard rubber becomes plastic and flowable, subjecting the plastic disk to pressure directed axially thereof and localized on a relatively small area while the disk is confined in a molding die having the precise dimensions required, and finally cooling the disk in place.

4. The process of forming a hard rubber disk to precise dimensions consisting in preforming it to less than the required finished dimensions, heating it to a temperature at which hard rubber becomes plastic and flowable, pressing a plunger into the plastic disk along a line substantially coincident with the transverse axis thereof while the disk is confined in a molding die having the precise dimensions required, and finally cooling the disk in place.

5. The process of forming a hard rubber disk to precise dimensions consisting in preforming it to less than the required finished dimensions, heating it to a temperature at which hard rubber becomes plastic and flowable, subjecting opposite sides of the plastic disk to axially directed pressure localized on relatively small areas while the disk is confined in a molding die having the precise dimensions required, and finally cooling the disk in place.

6. The process of forming a hard rubber disk to precise dimensions consisting in preforming it to less than the required finished dimensions, heating it to a temperature at which hard rubber becomes plastic and flowable, pressing a pair of plungers into the opposite sides of the plastic disk along a line substantially coincident with the axis of the disk while the disk is confined in a molding die having the precise dimensions required, thereby causing the rubber to flow radially and completely fill the die cavity, and finally cooling the disk.

7. The process of forming a hard rubber article to precise dimensions, consisting in preforming it to less than the required finished dimensions, heating it to a temperature at which hard rubber becomes plastic and flowable, pressing a plunger or plungers into the plastic rubber while confined in a molding die having the precise dimensions required, and finally cooling the article in place.

This specification signed on this the 12th day of April, A. D. 1923.

JOHN THOMSON.